Aug. 4, 1931.  J. C. McFADYEN  1,817,089
AEROPLANE CONSTRUCTION
Filed July 15, 1929
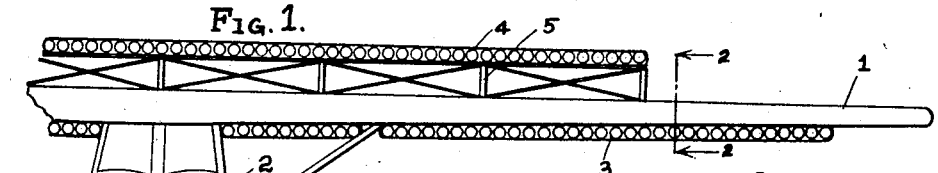
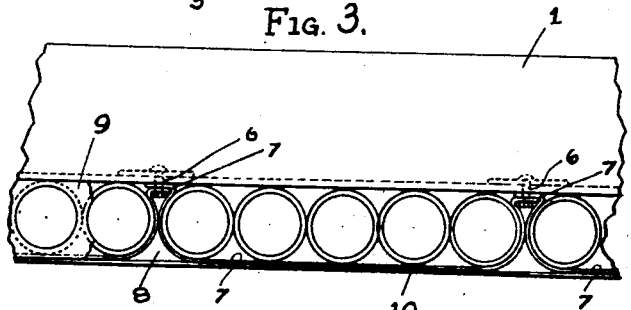
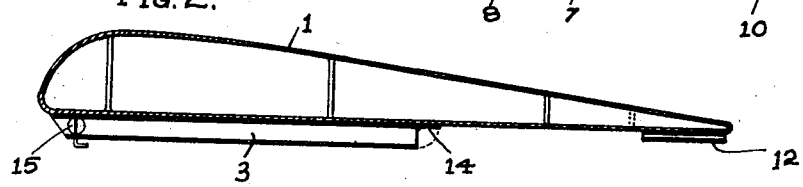
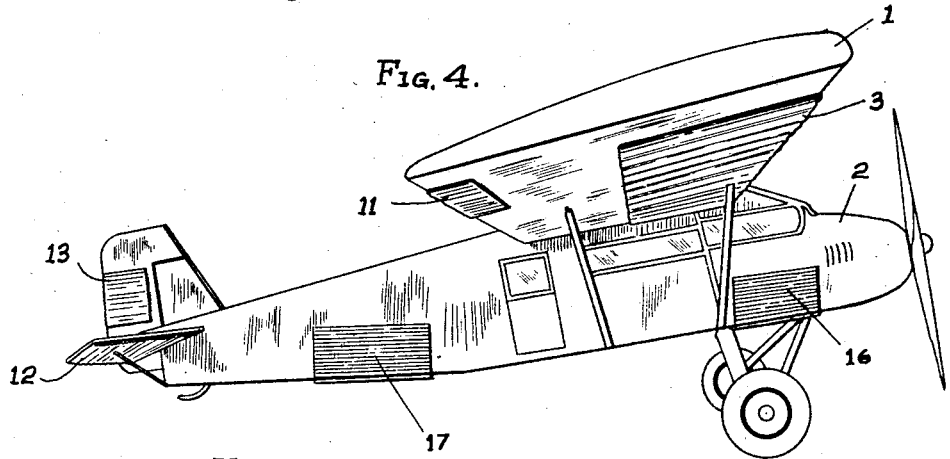
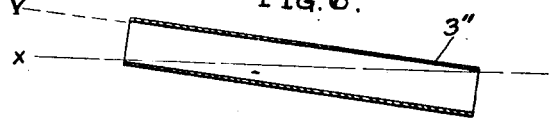
INVENTOR.
John C. McFadyen,
BY Miller Boykin & Bried
ATTORNEYS.

Patented Aug. 4, 1931

1,817,089

UNITED STATES PATENT OFFICE

JOHN C. McFADYEN, OF LAKEPORT, CALIFORNIA, ASSIGNOR OF ONE-THIRD TO WILLIAM H. EDMANDS AND ONE-THIRD TO NED M. SLEEPER

AEROPLANE CONSTRUCTION

Application filed July 15, 1929. Serial No. 378,411.

This invention relates to aeroplane construction and has for its objects improvements which may be built into an aeroplane or attached thereto and whereby advantages in lift and stability of the craft in flight is secured.

Briefly described my invention comprises combining with the aerofoils, and with the guiding surfaces, or both, a plurality of relatively small tubular elements in a manner found to considerably increase the lifting power of an aerofoil or increase the effectiveness of ailerons, rudder, elevators, or any such guiding surfaces to which the tubular elements may be applied.

Before describing the invention it would be well to state that the value of tubular areofoil construction has been suggested in some prior constructions using a large cylindrical aerofoil or body, as it has been found that an open-ended tube when moved longitudinally through the air develops a considerable lifting power and also maintains direction of flight without being easily influenced by conditions usually causing loss of stability or control in aeroplanes supported by ordinary aerofoil construction, but such constructions as proposed have been impracticable for one reason or another and most of them lost the advantages obtained through long process of development in the modern aeroplane design.

I have discovered that groups of tubes of relatively small diameter have collectively perhaps even greater advantages than large hollow cylinders, and that they may be secured in layers to the undersides of the wings, ailerons, rudder, elevator, etc. of standard aeroplanes to thus add their advantages to the plane while at the same time preserve most of the advantages of its own particular construction. Also that layers of tubes on the fuselage are of advantage in aiding the lift.

In the drawings accompanying this application I show the application of my invention to a monoplane though no limitation is to be implied therefrom as the invention is equally applicable to any type of air craft.

In the drawings Fig. 1 is a front view of portion of an aeroplane equipped with layers of my tubular elements.

Fig. 2 is an enlarged cross section of the wing of the plane as seen from the line 2—2 of Fig. 1.

Fig. 3 is an enlarged broken front view of a portion of the tubular layer of Fig. 1 showing the manner of securing them to the wing structure.

Fig. 4 is a side view of an aeroplane with my tubular layers shown secured to various parts of the air-guiding members.

Figs. 5 and 6 are diagrams of two different length tubes tipped at an angle to illustrate the advantages of relatively short tubes.

In further detail: In Fig. 1 the wing 1 of the aeroplane 2 is shown equipped on its underside with a layer of relatively small openended tubes 3 preferably of thin sheet aluminum, also a similar layer 4 mounted above the wing on a suitably braced trestle 5. The tubes are preferably of thin aluminum and are relatively small in diameter, good results having been obtained with tubes as small as two or three inches in diameter on a small plane, to two, three or four times this on a large plane, and it has also been found that there is an important relation between length and diameter for best results, as the longer the tubes of a given diameter the lesser inclination can it have with reference to a horizontal direction of flight, before the angular relation of its upper and lower walls interfere with the free flow of a stream of air through the tube. This is illustrated in Figs. 5 and 6 showing respectively short and long tubes 3′—3″ and a horizontal line X intersecting the upper and lower walls at the entering and leaving end of the tube at the different angles of inclination Y—Y′ of the tubes respectively.

On a small plane tubes 4 inches in diameter and about a foot long have been found very effective in carrying out the objects of the invention.

The tubes are preferably arranged in groups as the five shown in Fig. 3 and secured firmly to the wing structure by bolts 6 passing through straps 7, or by any other suitable means, and they lie parallel in longitudinal extension of the fuselage on opposite sides thereof for a considerable distance along the wing structure.

It has been found that the triangular interstices 8 normally formed between adjacent tubes add nothing to the lifting effects and accordingly are preferably covered at both ends by a plate 9 or fabric so as to force substantially all the air to pass through the tubes proper, and the outer surfaces of the tubes exposed to air pressure are preferably entirely covered with a sheet of metal or fabric as at 10 so as to provide a plain surface.

A similar layer of smaller open-ended tubes 11 is provided on the ailerons, also at 12 on the elevators, 13 on the rudder sides, and sometimes at other points on the structure, as at 16 and 17 on the under portion and sides of the fuselage.

In the larger tubes it is sometimes desirable to provide means for controlling the flow of air, and to this end I have indicated in Fig. 2 a flapper valve 14 extending across the rear open ends of the tubes 3 and also internal dampers as indicated at 15 which may be turned to more or less shut off the tube space, the valves being operated by any suitable system of linkage not shown in the drawings.

I find in practice the greatest advantage to result from a layer of tubes secured to the underside of the wing as indicated in Fig. 2, leaving the upper curve of the wing to function in the normal manner, but an extra layer as at 4 covered on outer sides (top and bottom) by sheet material, and the interstices blocked at the ends as explained for Fig. 3 has been found of additional advantage, as well as has the application of two or more superimposed layers of the tubes at the positions mentioned, but the exact relation of diameters to lengths of the tubes has not been determined, and hence I do not limit myself to any proportion of diameters to lengths of tubes, nor to their application in single or multiple layers, nor at one or both sides of wings, ailerons, elevators, rudders, or any other parts of an air craft, whether same be of the monoplane, biplane or any other type, or whether the tubes be built into the planes or attached as an auxiliary, and therefore I claim:

1. In an aeroplane, a layer of tubes open at opposite ends, said tubes arranged adjacent the surface of an aerofoil with the tubes extending fore and aft.

2. In an aeroplane, a layer of tubes open at opposite ends, said tubes arranged adjacent the under-surface of the wing with the tubes extending fore and aft.

3. In an aeroplane, a layer of tubes open at opposite ends, said tubes arranged adjacent the under-surface of the wing with the tubes extending fore and aft and similar layers of open-ended tubes arranged adjacent the various air guiding surfaces of the plane.

4. In an aeroplane, a layer of open-ended tubes arranged adjacent the under-surface of the wing with the tubes extending fore and aft, and a layer of open-ended tubes mounted above the upper surface of the wing.

5. In an aeroplane, a layer of tubes open at opposite ends, said tubes arranged adjacent the surface of an aerofoil with the tubes extending fore and aft, and means for controlling the amount of air flowing through the tubes.

6. In an aeroplane, a layer of tubes open at opposite ends, said tubes arranged adjacent the surface of an aerofoil with the tubes extending fore and aft, and spaced valves arranged for restricting the free passage of air through the tubes.

7. In an aeroplane, a layer of tubes open at opposite ends, said tubes arranged adjacent the surface of an aerofoil with the tubes extending fore and aft, said tubes being in groups for handling as a unit.

8. In an aeroplane, a layer of open-ended tubes arranged adjacent the surface of an aerofoil with the tubes extending fore and aft, and a substantially plain sheet covering the outer side of the layer.

9. In an aeroplane, a layer of open-ended tubes arranged adjacent the under-surface of the wing with the tubes extending fore and aft, and a layer of open-ended tubes mounted above the upper surface of the wing having a substantially plain sheet covering the upper and lower sides of the layer.

10. In an aeroplane, a layer of open-ended tubes arranged adjacent the surface of an aerofoil with the tubes extending fore and aft, and means blocking the ends of the spaces between the tubes.

11. In an aeroplane, a layer of open-ended tubes arranged adjacent the surface of an aerofoil with the tubes extending fore and aft, a substantially plain sheet covering the outer side of the layer, and means blocking the ends of the spaces between the tubes.

12. In an aeroplane, a layer of tubes open at opposite ends, said tubes secured to the underside of the wing at opposite sides of the fuselage, the tubes being substantially parallel to the fuselage.

13. In an aeroplane, a layer of tubes open at opposite ends, said tubes secured to the underside of the wing at opposite sides of the fuselage.

14. In an aeroplane, a layer of tubes open at opposite ends, said tubes secured to the underside of the wing at opposite sides of the fuselage, the tubes being substantially parallel to the fuselage and being of lesser length than the width of the wing.

JOHN C. McFADYEN.